United States Patent [19]

Sako et al.

[11] Patent Number: 5,506,623
[45] Date of Patent: Apr. 9, 1996

[54] DATA COMPRESSION METHODS AND SYSTEMS WITH QUANTIZATION DISTORTION MEASUREMENT MEANS

[75] Inventors: Yoichiro Sako, Chiba; Yuichi Kojima, Kanagawa, both of Japan

[73] Assignee: Sony Corporation, Japan

[21] Appl. No.: 416,490

[22] Filed: Apr. 4, 1995

Related U.S. Application Data

[63] Continuation of Ser. No. 989,079, Dec. 11, 1992, abandoned.

[30] Foreign Application Priority Data

Dec. 19, 1991 [JP] Japan .................................. 3-354825

[51] Int. Cl.⁶ .................................................... H04N 7/24
[52] U.S. Cl. ............................ 348/405; 348/419; 381/30; 395/2.39
[58] Field of Search ...................................... 358/136, 133, 358/135; 395/2.31, 2.33, 2.38, 2.39; 381/29, 30, 36; 348/419, 405, 400, 401, 402, 409, 415, 416, 390, 384; H04N 7/13, 7/133, 7/137

[56] References Cited

U.S. PATENT DOCUMENTS

| | | | |
|---|---|---|---|
| 4,751,736 | 6/1988 | Gupta et al. .............................. | 381/31 |
| 5,025,482 | 6/1991 | Murakami et al. ...................... | 382/56 |
| 5,029,019 | 7/1991 | Yoshihara et al. ...................... | 358/447 |
| 5,029,112 | 7/1991 | Sakamoto et al. ...................... | 364/521 |
| 5,136,283 | 8/1992 | Nobs ....................................... | 340/799 |
| 5,138,144 | 8/1992 | Sakamoto ............................... | 250/208.1 |
| 5,144,426 | 9/1992 | Tanaka et al. .......................... | 358/133 |
| 5,151,941 | 9/1992 | Nishiguchi et al. .................... | 381/36 |
| 5,301,242 | 4/1994 | Gonzales et al. ....................... | 382/56 |
| 5,349,383 | 9/1994 | Parke et al. ............................. | 348/405 |
| 5,410,351 | 4/1995 | Kojima ................................... | 348/401 |
| 5,412,431 | 5/1995 | Vogel ...................................... | 348/405 |

FOREIGN PATENT DOCUMENTS

| | | | |
|---|---|---|---|
| 399487 | 11/1990 | European Pat. Off. ........ | H04N 7/133 |
| 57-125517 | 8/1982 | Japan ............................. | H03K 13/2 |
| 63-110821 | 5/1988 | Japan ............................. | H03M 3/4 |
| 2202285 | 8/1990 | Japan ............................. | H04N 7/13 |
| 3129980 | 6/1991 | Japan ............................. | H04N 7/13 |
| 3255792 | 11/1991 | Japan ............................. | H04N 7/133 |
| 5041859 | 2/1993 | Japan ............................. | H04N 7/13 |

Primary Examiner—Thai Q. Tran
Assistant Examiner—Bryan S. Tung
Attorney, Agent, or Firm—Limbach & Limbach; Charles P. Sammut

[57] ABSTRACT

A data transmission system, permits data transmission without failure while ensuring a substantially constant picture quality or audio quality irrespective of the source of data. The data transmission system transmits data after conversion thereof into digital data and compression of the same. In the system, the distortion in data to be transmitted is measured, and the quantization step size is controlled according to the measured distortion to hold the distortion constant, thus permitting data transmission while maintaining constant quality of the transmitted data irrespective of the data source kind.

13 Claims, 3 Drawing Sheets

5,506,623

DATA COMPRESSION METHODS AND SYSTEMS WITH QUANTIZATION DISTORTION MEASUREMENT MEANS

This is a continuation of application Ser. No. 07/989,079 filed on Dec. 11, 1992, now abandoned.

BACKGROUND OF THE INVENTION

1. Field of the Invention

This invention relates to a data transmission system, and more particularly to an improvement of transmitting picture data after compression thereof through a communication line or the like.

2. Description of the Prior Art

Conventionally, in a data transmission system for transmitting picture data and audio data to remote places or recording these data in a digital system recording media, the picture data and audio data are compressed by utilizing correlation between data thereof in order to obtain efficient transmission of picture data having large data quantities.

Assuming an imaginary transmission line free from noise, the compression and transmission factors of data transmitted from the data transmission system 1 can be thought to be as follows (FIG. 1).

When coding data $u_L$ output from a data source through an encoder 2 into a digital signal and transmitting data $c_k$ obtained by data compression through a noise-free transmission line 3, and denoting decoded data from a decoder 4 by $v_L$, the compression factor C of the transmitted data can be expressed by following formula:

$$C = \frac{A}{A_R} \tag{1}$$

Denoted by A is the number of bits per unit time of data $u_L$ before compression, and by $A_R$ the number of bits per unit time of data $v_L$ after compression. The data transmission system 1 is adapted to transmit data with the compression factor C thereof which is controlled to be constant irrespective of the kind of the transmitted data.

However, depending on the kind of the transmitted picture contents or audio contents the control of the compression factor C to a constant value sometimes results in considerable deterioration of the picture quality or audio quality.

For example, with pictures having less inter-frame correlation, such as those having many scene changes, it is difficult to compress data. Therefore, there occurs great difference of the distortion measure d ($u_L$, $v_L$) even if the compression factor C is controlled to be constant.

A distortion measure d ($u_L$, $V_L$) is the double sum mean distortion which is defined by following equation:

$$d(u_L, v_L) = \|u_L - v_L\|_2 = \left( \sum_{i=0}^{L-1} |u_i - v_i|^2 \right)^{1/2} \tag{2}$$

It may be thought to hold the distortion measure d ($u_L$, $v_L$) within a predetermined value. In this case, depending on transmitted data the compression factor C is infinitely small, and the transmission capacity of the transmission line 3 is exceeded. In such a case, the data transmission system 1 can no longer be used.

This is so in that a small compression factor may dictate a data quantity corresponding to a data transmission rate more than the maximum rate, at which the data transmission system 1 can transmit data in unit time, thus resulting in failure of transmission.

SUMMARY OF THE INVENTION

In view of the foregoing, an object of this invention is to provide a data transmission system, which permits data transmission without failure while ensuring a substantial constant quality level of picture or audio quality irrespective of the source of data.

The foregoing objects and other objects of the invention have been achieved by the provision of the data transmission system, comprising, a data compression means 15 including a quantizer 19 for quantizing a data signal S1 therethrough into quantized data S6 to be transmitted, means for locally decoding the quantized data from the quantizer a distortion measurement means 25 for and measuring distortion of the quantized data with respect to the data signal from the decoded data signal S8 obtained by the decoding, and a quantization step size control means 30 for controlling the step size of quantization in the quantizer 19 according to the distortion to thereby control the distortion of the quantized data S6 to be constant.

The other objects of the invention have been achieved by the provision of the data transmission system, comprising the data compression means 15 including a quantizer 19 for quantizing a data signal therethrough into the quantized data S6 to be transmitted, means for locally decoding the quantized data S6 from the quantizer 19 the distortion measurement means 25 for measuring distortion of the quantized data S6 with respect to the data signal S1 from the decoded data signal S8 obtained by the decoding, first quantization step size control means 30 for controlling the step size of quantization in the quantizer 19 according to distortion to thereby control the distortion of the quantized data to be constant, a data quantity measurement means 33 for measuring the quantity S14 of the generated quantized data S6, second quantization step size control means 32 for controlling the step size of quantization in the quantizer 19 according to the quantity S14 of the generated quantized data S6 to thereby control the distortion of the generated quantized data S6 to be constant, and a switching means 34 for switching first and second quantization step size control signals S11 and S12 output from the first and second quantization step size control means 30 and 32 to be selectively supplied to the quantizer 19 according to the generated quantized data quantity.

According to the invention, the quantization data S5 which is quantized in the quantizer 19 is locally decoded, and distortion of the decoded data signal S8 is measured. A quantization step size is controlled to keep constant distortion of the data signal S1 which is transmitted according to said distortion. Thus the quality of data to be compressed and transmitted is kept constant irrespective of the data source kind.

Further, according to the invention, on the basis of the quantity S14 of the quantization data S6, the quantization step size is controlled, thereby switching over from first quantity step size control signal S11, which is control due to keep constant distortion of the quantization data S6, to second quantization step size control signal S12, thus the quality of data to be transmitted is kept constant as well as keeping the generated data quantity S14 below a constant level irrespective of the kind of data source.

In the foregoing, in the data transmission system according to the invention, which transmits data after conversion thereof into digital data and compression of the same, the distortion in the data to be transmitted is measured, and the quantization step size is controlled according to the measured distortion such as to maintain the distortion to be constant. It is thus possible to permit data transmission while maintaining a constant quality of the transmitted data irrespective of the data source kind.

The nature, principle and utility of the invention, it will become more apparent from following detailed description when read in conjunction with the accompanying drawings in which like parts are designated by like reference numerals or characters.

DETAILED DESCRIPTION OF THE INVENTION

Preferred embodiments of this invention are now described reference to the accompanying drawings:

(1) First Embodiment

Figure 3:
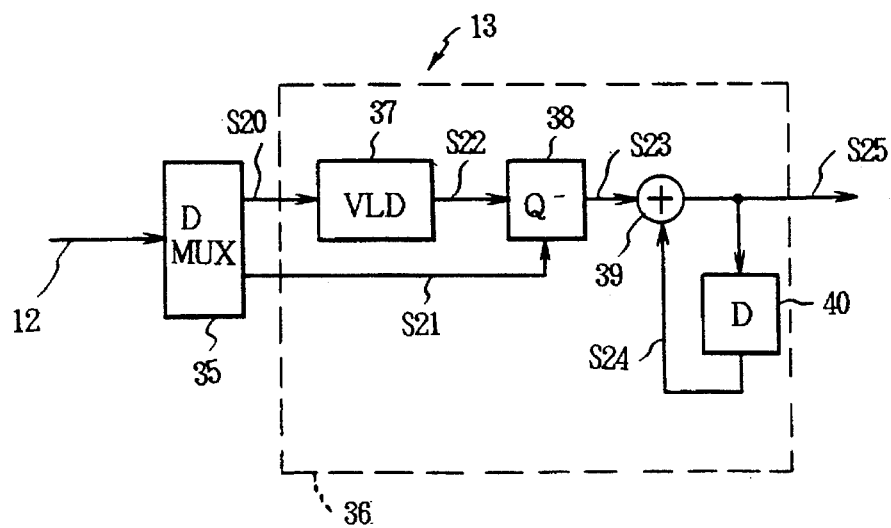
FIG. 3 is a block diagram showing a decoder of the data transmission system of the first embodiment according to the invention.
Figure 2:
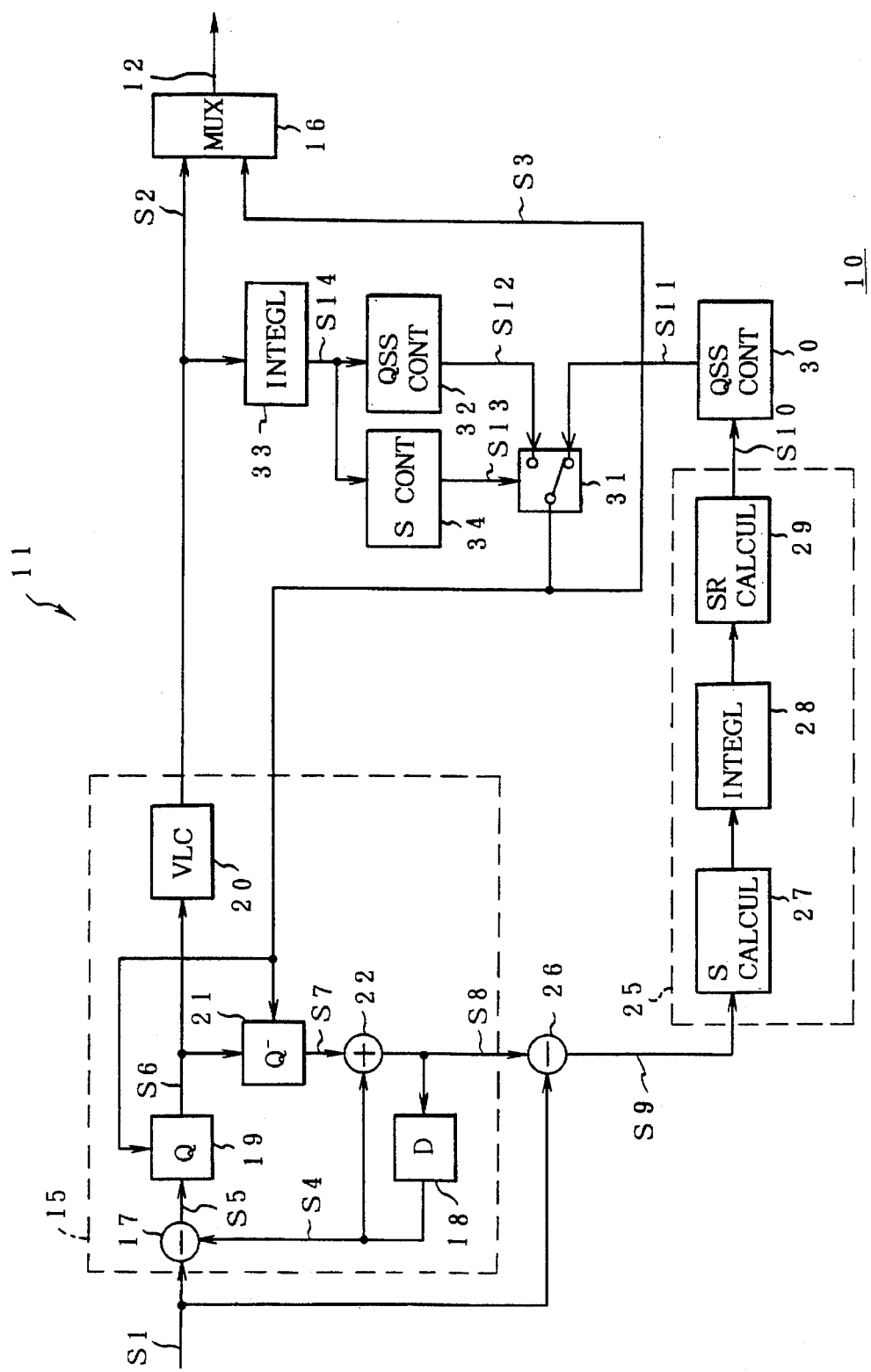
FIG. 2 is a block diagram showing an encoder of a data transmission system of the first embodiment according to the invention.

Referring to FIGS. 2 and 3, 10 generally designates a data transmission system. Transmission data $u_L$ obtained by coding in an encoder 11 is transmitted via a transmission line 12 to a decoder 13, and the decoder 13 decodes the received data $v_L$.

In the encoder 11, a DPCM (differential pulse code modulation) encoding circuit 15 compresses the transmission data $u_L$ to be transmitted as compressed data S2, and a multiplexer 16 multiplexes the compressed data S2 with a quantization data S3 and outputs the resultant multiplexed data to a transmission line 12.

The DPCM encoding circuit 15 includes a differential data generation circuit 17 being a subtraction circuit. The differential data generation circuit 17 obtains a differential data S5 based on a locally decoded data S4 input from a delay circuit 18 and data S1 to be transmitted and outputs the differential data S5 to a quantizing circuit 19.

In the DPCM encoding circuit 15, the quantizing circuit 19 quantizes the differential data S5 with a quantization which is predetermined for every predetermined unit quantity of data, and a variable length coding (VLC) circuit 20 performs a predetermined VLC process on the quantized data S6 thus obtained, the processed data being supplied to the multiplexer 16.

Further, in the DPCM encoding circuit 15 an inverse quantizing circuit 21 inverse quantizes the quantized data S6 to typical values, the inverse quantized data S7 thus obtained being supplied as decoded data to an addition circuit 22.

The addition circuit 22 adds the locally decoded data S4 to the inverse quantized data S7 to a locally decoded received data $v_L$, as the same as it will be decoded in the decoder 13, thus supplying a locally decoded data S8 to a subtraction circuit 26 and also to a delay circuit 18.

The delay circuit 18 delays the locally decoded data S8 for a predetermined period of time and outputs the delayed data to the differential data generation circuit 17 and also to the addition circuit 22.

When the subtraction circuit 26 receives the locally decoded data S8, it obtains differential data S9, which corresponds to the data S1 to be transmitted, and outputs the differential data S9 to a distortion measure judgment circuit 25.

The distortion measure judgment circuit 25 processes the differential data S9 and includes a square calculation circuit 27 having a conversion table, an integration circuit 28 and a square root calculation circuit 29. When it obtains a distortion measure given by the equation (2), it outputs distortion measure data S10 to quantization step size control circuit 30.

According to the detected distortion measure data S10 the quantization step size control circuit 30 outputs a quantization step size control signal S11 through a switching circuit 31 to the quantizing circuit 19, to the inverse quantizing circuit 21 and to the multiplexer 16, whereby the quantization step size is controlled to keep constant the distortion in the data S1 to be transmitted.

To the other input terminal of the switching circuit 31 is input a quantization step size control signal S12 from a quantization step size control circuit 32. Thus, either quantization step size signal S11 or S12 is switched to serve as output according to a switching signal S13.

When the integration circuit 33 outputs data quantity data S14 representing the quantity of the transmission data S2 per predetermined unit time, the quantization step size control circuit 32 outputs the quantization step size control signal S12 for controlling to be constant the quantity of the data S1 to be transmitted.

In addition, when the integration circuit 33 outputs the data quantity data S14, a switching control circuit 34 judges whether the quantity of generated data is above a predetermined reference quantity.

If the quantity of generated data is not above the predetermined reference quantity, the switching control circuit 34 outputs a switching signal S13 for selecting the quantization step size control signal S11 input from the quantization step size control circuit 30, thereby controlling the distortion generated in the data S1 to be transmitted to be constant. If the generated data quantity is above the predetermined reference quantity, the circuit 34 outputs a switching signals 13 for selecting the quantization step size control signal S12 to control the quantity of data S1 generated for transmission.

Figure 1:
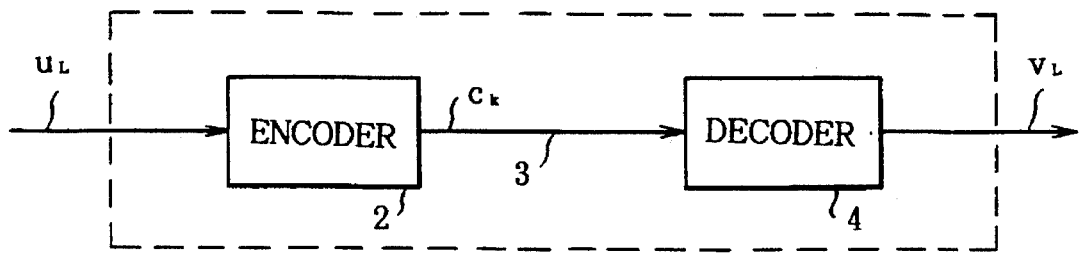
FIG. 1 is a block diagram for explaining data compression factor and distortion.

When the decoder 13 (FIG. 1) receives data transmitted from the encoder 11 (FIG. 2) via the transmission line 12, a de-multiplexer 35 (FIG. 3) separates its input into compressed transmitted data S20 and quantized data S21, these data being supplied to a DPCM decoding circuit 36 as shown in FIG. 3.

In the DPCM decoding circuit 36, when a variable length decoding (VLD) circuit 37 receives the transmitted data S20, it decodes the quantized data S22 in the converse procedure to that in the variable length coding circuit 20 and outputs the decoded data to an inverse quantizing circuit 38 and restores typical value data S23 according to a quantized data S21 separated by the de-multiplexer 35.

An addition circuit 39 adds the typical value data S23 and decoded data S24 and thereby outputs decoded data S25 to a delay circuit 40.

In the above construction, in the encoder 11 the integration circuit 33 determines the quantity of the compressed transmission data S2 generated from the DPCM encoding circuit 15. The distortion measure judgment circuit 25 determines the extent of distortion generated in the transmission data S2.

The distortion measure judgment circuit 25 determines the double integration distortion as defined by the equation (2) based upon the differential data S9. The differential data S9 is output from the subtraction circuit 26, the subtraction circuit 26 having as inputs the locally decoded data S8 and the data S1 to be transmitted the subtraction circuit 26 and data S1 to be the distortion measure judgment circuit 25 outputs the distortion measure data S10 to the quantization step size control circuit 30.

The integration circuit 33 detects the quantity of transmission data S2 supplied to the multiplexer 16 per unit time and outputs the data quantity data S14 to the quantization step size control circuit 32.

At this time, the quantization step size control circuit 30 outputs the quantization step size control signal S11 for controlling the quantization step size according to the distortion measure data S10 to maintain constant the distortion generated in the signal S1 to be transmitted to be constant.

Also, at this time the quantization step size control circuit 32 outputs the quantization step size control signal S12 for controlling the quantization step size according to the data quantity data S14 such that the quantity of the generated transmission data S2 is maximized, i.e., corresponds to the data transmission capacity of the data transmission system 10 (which is 10 [Mbit/sec] in this embodiment).

When the reference quantity in the switching control circuit 34 is set to the data transmission capacity of the data transmission system 10 (that is 10 Mbit/sec), with a quantity of data S2 to be transmitted less than the reference quantity, the circuit 34 makes the switch circuit 31 output quantization step size control signal S11 to the quantizing circuit 19, inverse quantizing circuit 21 and multiplexer 16 for controlling the distortion in the data S2 to be transmitted to a constant level.

Thus, the data transmission system 10 can control the distortion to be constant even with pictures, the data of which can be difficult to compress and readily distorted when such data consists of pictures with many scene changes. It is thus possible to effectively avoid deterioration of the picture quality unlike the prior art case of controlling the compression factor to be constant by taking the quantity of generated data into consideration.

Further, when the quantity of generated transmission data S2 exceeds a reference quantity, the switching control circuit 34 makes the switch circuit 31 output the quantization step size control signal S12 to the quantizing circuit 19, inverse quantizing circuit 21 and multiplexer 16 to control the quantity of generated data to 10 [Mbit/sec].

Thus, it is possible to prevent the data transmission system 10 from becoming unable to transmit data due to generation of transmission data exceeding in quantity the data transmission capacity of the system caused by reduction of the compression factor to be infinitely low.

With the above construction, the switching control circuit 34 permits the data compression factor C to be held above a predetermined value by controlling the quantity of generated data to be within a predetermined reference quantity through comparison of the data quantity data S14 with a predetermined reference level, and it also controls the quantization step size such that the distortion in the data S1 to be transmitted is within a predetermined level in a small quantity range of the data quantity data S14 with respect to the predetermined reference quantity. Thus, it is possible to permit data transmission while maintaining substantially constant picture quality and audio quality irrespective of the kind of source data.

(2) Second Embodiment

Figure 4:
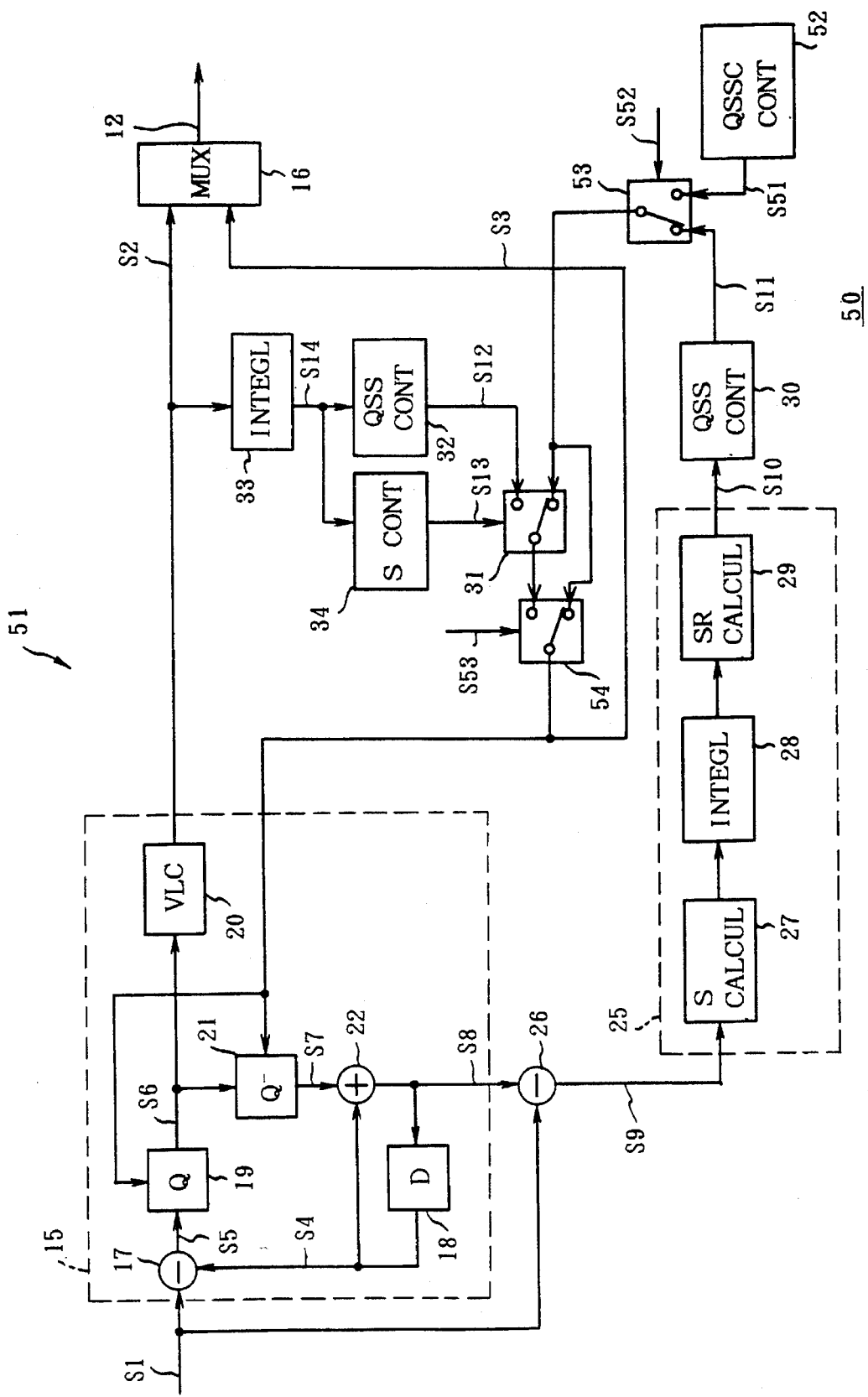
FIG. 4 is a block diagram showing an encoder of a data transmission system of the second embodiment according to the invention.

FIG. 4 uses identical reference numerals to denote components equivalent to those in FIG. 2. Generally indicated at 50 is a data transmission system in which encoded data $u_L$ output by an encoding device 51 is sent to a decoding device 13 (FIG. 3) via a communication channel 12, and the decoding device 13 decodes received data $v_L$.

In this embodiment, the encoder 51 has the structure identical to that of the encoder 11 (FIG.2), except that the encoder 51 has a quantization step size constant control circuit 52 for generating a quantization step size control signal S51 and additional two switching circuits 53 and 54.

In accordance with a switching control signal S52, the switching circuit 53 switches back and forth between a quantization step size control signal S11 used to control the quantization step size and the control signal S51 used to control the quantization step size to a constant value independently of the Generated data and distortion quantity, and outputs the selected signal to a switching circuit 31.

Thus, the encoder 51 performs switching between the control of the quantization step size based on the Generated data quality and the control of the quantization step size based on the distortion quantity, or performs switching the control of the quantization step size based on the generated data quantity and the control of the quantization step size based on a fixed quantization step size.

The switching circuit 54 switches between the selected output provided by the switching circuit 31 and the selected output provided by the switching circuit 53 in accordance with the switching control signal S53, and outputs the resulting selected signal to a quantizing circuit 19 and an inverse quantizing circuit 21.

Thus, the encoder 51 is operable to select either one quantization processing which assures consistent quality data transmission on condition that no transmission failure takes place, by appropriately selecting either of the two kinds of quantization step size control signals or the other quantization processing which assures high quality data transmission by employing a single quantization step size control signal only.

It should be noted that the switching control signals S52 and S53 may be manually switched by a user.

The operation of the encoder 50 in the above arrangement is discussed below for each of three possible cases: i.e., the maximum transmission rate $V_{MAX}$ of the quantized data S6 is faster than, equal to, or slower than the maximum permissible transmission rate $V_{CONST}$ of the transmission line 12.

In the case where the maximum transmission rate $V_{MAX}$ can be faster than the maximum permissible rate $V_{CONST}$ of the transmission line 12, the user may choose either one quantization processing which permits either the quantization controlling based on the generated data quantity or the quantization controlling based on the distortion quantity, or the other quantization processing which permits the quantization controlling based on the fixed quantization step size determined independently of the generated data quantity or the quantization controlling based on the generated data quantity.

In the first choice, i.e., appropriate switching between the quantization controlling based on the generated data quantity and the quantization controlling based on the distortion quantity, the encoder 51 functions such that the switching circuits 53 and 54 select their respective input terminals coupled to the quantization step size control circuit 30 and the switching circuit 31.

The above example has already been discussed in the first embodiment. The encoder 51 operates to transmit the transmission data S2 to the transmission line 12 in the following manner: while the generated data quantity stays below a predetermined threshold, the encoder 51 controls the distortion quantity of the transmission data S2 to a constant value by controlling the quantization step size by means of the quantization step size control signal S11 provided by the quantization step size control circuit 30; at the moment the generated data quantity exceeds the predetermined threshold, the encoder 51 limits the generation of the data quantity by switching to the quantization step size control signal S12 provided by the quantization step size control circuit 32.

In the second choice, i.e., a case where uniform quantization step size of the transmission data has overriding importance in encoding the transmission information data S1, the encoder 51 functions so that the switching circuit 53 and 54 select their respective input terminals coupled to the quantization step size constant control circuit 52 and the switching circuit 31.

In the course of the above operation, in response to the switching control of the switching control circuit 34, the encoder 51 properly switches between the quantization controlling based on the generated data quantity and the quantization controlling based on the constant quantization step size.

Specifically, while the generated data quantity stays below the predetermined threshold, the encoder 51 encodes the transmission information data S1 at a constant quantization step size by controlling the quantization step size by means of the quantization step size control signal S51 output by the quantization step size constant control circuit S2. Thus, the encoder 51 transmits the transmission data S2 at a substantially constant distortion.

When the generated data quantity exceeds the predetermined threshold, the data transmission via the transmission line 12 may fail. Thus, the encoding device 51 limits the generation of the data quantity by switching to the quantization controlling by means of the quantization step size control signal S12 provided by the quantization step size control circuit 32. This allows the transmission data S2 to be transmitted at a substantially consistant quality level.

In the case where the maximum transmission rate $V_{MAX}$ is known to be smaller than the permissible transmission rate $V_{CONST}$ from technical specifications and the like, the encoder 51 causes the switching circuit 52 to switch to the input terminal coupled to the switching circuit 52 according to the user's instructions, and then causes the switching circuit 52 to select either the input terminal for the quantization step size control circuit 30 or the input terminal for the quantization step size constant control circuit 52.

In the former case, for example, the encoder 51 continuously controls the quantization step sizes of the quantizing circuit 19 and the inverse quantizing circuit 21, in accordance with the quantization step size control signal S11 provided by the distortion measurement judgment circuit 25. In the latter, the encoder 51 controls the quantization step sizes in accordance with the quantization step size control signal S51 provided by the quantization step size constant circuit 52.

This allows the distortion caused in the transmission data S2 to be kept constant even when pictures with rapid scene-to-scene change is handled. Such picture normally present a difficulty in information compression process, and tend to suffer from distortion in the process. Also, even when a picture, such as one with a lot of motion, tends to suffer from a large quantization step size, the quantization step size may be controlled to a uniform value.

As discussed above, by properly selecting the input terminals of the switching circuit 53 and 54, the encoding device 51 may be used as one system which, within the limitation where no transmission failure takes place, selects as appropriate between the quantization process of controlling the distortion quantity to a constant and the quantization process of controlling the quantization step size to a constant or as, another system which perform encoding process with the distortion quantity of the transmission picture continuously controlled to a constant.

As discussed above, the data transmission system comprises three switching circuits: the switching circuit 53 for switching between the quantization step size control signal S11 controlling the distortion quantity to a constant and the quantization step size control signal S51 controlling the quantization step size to a constant, the switching circuit 31 for switching between the selected output of the switching circuit 53 and the quantization control signal S12 controlling the generated data quantity to a constant, and the switching circuit 54 for switching selected outputs of both switching circuits 53 and 31. By controlling the switching circuits 53 and 54 according to the user's choice, the data transmission system is constructed which satisfies requirements imposed on a transmission system and presents the quality required on the transmission data S2.

(3) Other Embodiment

While in the above embodiment the reference quantity of generated data was set to correspond to the maximum data transmission rate of 10 [Mbit/sec], but this invention is not limited to this, and it may be set to various values, for instance 150 [Mbit/sec], depending on the application of the data transmission system.

Further, while the above embodiment concerned with the case of transmitting picture data or audio data after compression thereof, this invention is not limited to this, and the invention is applicable to the unity compression factor case, i.e., the case of transmitting data without compression thereof, from the considerations of the relation between the data source and the data transmission capacity of the data transmission line.

Further, while in the above embodiment the distortion measurement judgment circuit 25 obtains the distortion measure through comparison of the data S1 to be transmitted and the locally decoded data S8, this invention is not limited to this. For example, it is possible to use a contribution degree calculation circuit, which determines the distortion measure from contribution degree such as $K_L$ conversion.

Further, while in the above embodiment the integration circuit 33 is used to obtain the quantity of transmission data per unit time, this invention is not limited to this. For example, it is possible to permit control according to the quantity of data stored in a buffer memory in the multiplexer 16.

Further, in the above embodiments, both switching control signals S52 and S53 are selected in accordance with the manual input by the user. The present invention is not limited to this. Alternatively, the system may be designed to switch the signals for controlling on the basis of the automatic judgment.

Furthermore, in the above embodiment, the data transmission system is the encoder 10 in FIG. 2 or the encoder 50 in FIG. 4. The present invention is not limited to these. The present invention may be applied to recording or reproducing devices using optical disc or optical magnetic disc, or to ISDN communications devices.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A data transmission system comprising:

quantizing means for quantizing a data signal into quantized data to be transmitted;

decoding means operative to generate a decoded data signal from the quantized data;

distortion measurement means for measuring distortion of said quantized data based upon the data signal and the decoded data signal;

first quantization step size control means for controlling the step size of quantization in said quantizing means based upon the distortion measured by the distortion measurement means, the step size of quantization controlled to maintain the distortion constant;

data quantity measurement means for measuring a quantity of said quantized data;

second quantization step size control means for controlling the step size of quantization in said quantizing means according to said quantity of quantized data to be transmitted; and switching means for switching an input of the quantizing means between a first quantization step size control signal output from said first quantization step size control means and a second quantization step size control signal output from said second quantization step size control means.

2. The data transmission system according to claim 1, wherein said decoding means further comprises:

inverse quantizing means operative to inverse quantize the quantized data; and an addition circuit having a first input coupled to an output of the inverse quantizing means, a second input coupled to an output of a delay circuit, the delay circuit having an input coupled to an output of the addition circuit.

3. The data transmission system according to claim 2, wherein said decoding means further comprises:

means for applying the output of said addition circuit to a subtraction circuit to obtain differential data between said output of said addition circuit and said data signal to be transmitted, and for applying said differential data to the distortion measurement means.

4. The data transmission system according to claim 3, wherein said distortion measurement means further comprises:

a distortion measurement judgment circuit including a square calculation circuit operative to square said differential data, an integration circuit operative to integrate an output of said square calculation circuit and a square root calculation circuit operative to calculate the square root of an output of said integration circuit.

5. The data transmission system according to claim 1, wherein said switching means further comprises: means for selecting for input to the quantizing means said first quantization step size control signal when the information quantity per a predetermined unit time of said quantized data does not exceed a predetermined reference value and selecting for input to the quantizing means said second quantization step size control signal when the information quantity per a predetermined unit time of said quantized data exceeds said predetermined reference value.

6. A data transmission system producing quantized data from an information signal via quantizing means and transmitting said quantized data, said system comprising:

first quantization step size control means for controlling the quantization step size of said quantizing means to a constant;

generated information quantity measurement means for measuring generated information quantity of said quantized data;

second quantization step size control means for controlling the quantization step size of said quantizing means on the basis of the generated information quantity so that the generated information quantity of said quantized data is kept to a constant;

first switching means selecting and outputting, in accordance with the generated information quantity of said quantized data, between a first quantization step size control signal provided by said first quantization step size control means and a second quantization step size control signal provided by said second quantization step size control means; and second switching means for selecting between the selected output provided by the first switching means and the first quantization step size control signal, and for outputting a signal selected by the second switching means to said quantizing means.

7. A method of transmitting data comprising the steps of:

quantizing a data signal into quantized data to be transmitted;

decoding the quantized data to generate a decoded data signal;

measuring distortion of said quantized data based upon the data signal and the decoded data signal to form measured distortion;

controlling the step size of quantization based upon said measured distortion to thereby control the distortion of said quantized data based upon the measured distortion, the step size of quantization controlled to maintain the measured distortion constant;

measuring the quantity of said quantized data;

controlling the step size of quantization based upon the quantity of quantized data to be transmitted; and selectively switching between the step of controlling the step size of quantization based upon the measured distortion and the step of controlling the step size of quantization based upon the quantity of quantized data to be transmitted.

8. The method of transmitting data according to claim 7, wherein the step of decoding the quantized data further comprises the steps of:

inverse quantizing the quantized data;

delaying an output of an adder; and adding the delayed output of the adder to the inverse quantized quantized data to thereby generate the output of the adder.

9. The method of transmitting data according data transmission system according to claim 8, wherein the step of decoding the quantized data further comprises the steps of:

subtracting the output of the adder from the data signal to generate differential data representative of distortion of the quantized data.

10. A method of transmitting data according to claim 9, wherein the step of measuring distortion further comprises the steps of:

squaring the differential data;

integrating the squared differential data; and determining the square root of the integrated squared differential data.

11. The method of transmitting data according to claim 7, wherein step of selectively switching further comprises the steps of:

selecting a first quantization step size when information quantity representing the information quantity per a predetermined unit time of said quantized data does not exceed a predetermined reference value and selecting a second quantization step size when the information quantity representing the information quantity per a predetermined unit time of said quantized data exceeds said predetermined reference value.

12. A method of producing quantized data from an information signal transmitting said quantized data, said method comprising the steps of:

controlling to be constant the quantization step size for quantizing an information signal, thereby outputting a first quantization step size control signal;

measuring a generated information quantity of said quantized data;

controlling the quantization step size for quantizing the information signal on the basis of the generated information quantity so that the generated information quantity of said quantized data is kept to a constant, thereby outputting a second quantization step size control signal;

measuring a distortion of said quantized data;

controlling the quantization step size based upon the measured distortion and outputting a third quantization size control signal;

selecting and outputting, in accordance with the generated information quantity of said quantized data, between the first quantization step size control signal and the third quantization step size control signal;

selecting between an output of the selecting and outputting step and the second quantization step size control signal; and selecting between an output of the selecting and outputting step and the output of the selecting step.

13. A data transmission system comprising:

quantizing means for quantizing a data signal into quantized data to be transmitted;

decoding means operative to generate a decoded data signal from the quantized data;

distortion measurement means for measuring distortion of said quantized data based upon the data signal and the decoded data signal;

first means for controlling the step size of quantization in said quantizing means based upon the distortion measured by the distortion measurement means, the step size of quantization controlled to maintain the distortion constant;

data quantity measurement means for measuring a quantity of the quantized data to be transmitted;

second means for controlling the step size of quantization in said quantizing means according to said quantity of quantized data to be transmitted;

third means for controlling the step size of quantization in said quantizing means to be constant;

first switching means for switching an input of the quantizing means between a first quantization step size control signal from the first quantization step size control means and a third quantization step size control signal from the third quantization step size control means;

second switching means for switching the input of the quantizing means between an output of the first switching means and a second quantization step size control signal from the second quantization step size control means; and third switching means for switching the input of the quantizing means between the first switching means and the second switching means.

* * * * *